(12) United States Patent
Smoot

(10) Patent No.: US 8,915,790 B2
(45) Date of Patent: Dec. 23, 2014

(54) LARGE-AREA CONTROLLED ELECTROSTATIC LEVITATION OF LIGHTWEIGHT SHOW OBJECTS

(71) Applicant: Disney Enterprises, Inc., Burbank, CA (US)

(72) Inventor: Lanny S. Smoot, Thousand Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 114 days.

(21) Appl. No.: 13/873,728

(22) Filed: Apr. 30, 2013

(65) Prior Publication Data

US 2014/0321024 A1    Oct. 30, 2014

(51) Int. Cl.
*A63G 31/00*    (2006.01)
*H02N 99/00*    (2006.01)
*A63G 33/00*    (2006.01)

(52) U.S. Cl.
CPC ..................................... *H02N 99/00* (2013.01)
USPC ................................ 472/68; 472/80; 446/140

(58) Field of Classification Search
CPC ......... A63G 1/10; A63G 31/00; A63G 31/16; A63J 5/00; A63J 5/02; A63J 21/00; B64D 23/00; A63H 33/00; A63H 33/06
USPC ............. 472/57, 68, 75, 80, 81; 446/140, 484
See application file for complete search history.

(56) References Cited

U.S. PATENT DOCUMENTS

| | | | | |
|---|---|---|---|---|
| 3,497,994 A | * | 3/1970 | Lee .............................. | 446/140 |
| 4,109,413 A | * | 8/1978 | Brown ......................... | 446/140 |
| 6,144,545 A | * | 11/2000 | Lee et al. ..................... | 361/233 |
| 7,815,484 B2 | * | 10/2010 | Kriman et al. ................ | 446/140 |
| 7,940,150 B2 | * | 5/2011 | Fu et al. ........................ | 335/296 |

* cited by examiner

*Primary Examiner* — Kien Nguyen
(74) *Attorney, Agent, or Firm* — Marsh Fischmann & Breyfogle LLP; Kent A. Lembke

(57) ABSTRACT

A system for electrostatically levitating an object with a body adapted for receiving a static charge. The system includes an array of at least three electrostatic generators, with each of the electrostatic generators including an exposed element that becomes statically charged during operation of the array. The system also includes a controller operating to generate control signals to the array to independently operate each of the electrostatic generators to provide the static charge at first, second, and third voltages. When positioned in a flight space above the array, the object is levitated above the array of the electrostatic generators by an electrostatic lifting force(s). Each of the electrostatic generators is a high voltage Van de Graaff generator. The first, second, and third voltages are in the range of 0 to 300,000 volts and are varied over time to direct the levitated object along a flight path by the controller.

19 Claims, 11 Drawing Sheets

LARGE-AREA CONTROLLED ELECTROSTATIC LEVITATION OF LIGHTWEIGHT SHOW OBJECTS

BACKGROUND

1. Field of the Description

The present invention relates, in general, to methods and systems for levitating lightweight objects such as for use in a show to entertain an audience, and, more particularly, to methods and systems for levitating lightweight objects in a controlled manner, e.g., with selectable or adjustable flight patterns and heights, using an array of electrostatic generators.

2. Relevant Background

Many recent theatrical or film productions have featured ephemeral levitating characters. These floating characters or objects are often presented through the use of animation and computer generated imagery in live action and animated works. For example, a recent animated film included floating and glowing will-o'-the-wisps that guided a main character through a forest while another film includes wood sprites and another includes flittering fairies. The inclusion of these small levitating or flying characters in films has led to an increased popularity of such characters with the general public.

As a result, there is growing a desire to include these characters and objects in "live" shows at theme parks and other settings especially entertainment where the main characters of such films and theatrical productions are playing large roles. Particularly, if a film depicted a main character, such as a human, an animal, or imaginary creature that walks on land, interacting with an ephemeral levitating object, it is often desirable to design a show where a human actor or a robotic figure entertains a crowd by taking the form of or representing the main film character and some technology is used to present the ephemeral levitating object. Preferably, the ephemeral levitating object would be able to move in a controlled manner near the main film character or to even interact with the main film character in real time.

While there is growing demand for small flying objects with ephemeral qualities, it has proven extremely challenging to engineers and show designers to provide these objects in a reliable and desirable manner. For example, one set of these flying objects were depicted in the underlying animated film as creatures that resembled flying jellyfish or similar animals, and, when brought into a real world setting with a main character that is human sized or somewhat larger, these flying or floating jellyfish would be 6 to 12 inches in diameter. In the animated films, these ephemeral objects fly close to humanoid characters in a graceful manner (or even an otherworldly grace), and, in some cases, the objects fly in groups and may even land on the humanoid characters or on elements of a set.

As a result, a live show based on these films preferably should be able to provide and include flying objects that imitate the objects' movements and characteristics in the film. Shows that utilize flying tricopters, quadcopters, or other unmanned, motorized flying objects are useful in some settings. Unfortunately, such devices are often loud and cannot provide the organic or natural locomotion of a floating jellyfish demanded by many show designers. These motorized objects are clearly manmade objects and not magical creatures, which can ruin a created display or effect for the audience. Further, the bulk of a quadcopter or similar device can make them undesirable for intimate settings where the audience may be in close proximity to the humanoid characters and any flying objects.

There remains a need for techniques for providing smaller flying objects in a manner that appears organic and non-motorized as one would imagine flight of a wood sprite or a will-o'-the-wisp. Further, it is desirable that techniques used allow for controlled flight of the flying objects to allow a flight pattern within a show space or flight volume to be at least generally defined for the flying objects.

SUMMARY

A system is provided for electrostatically levitating an object with a body adapted for receiving a static charge. The system includes an array of at least three electrostatic generators, with each of the electrostatic generators including an exposed element that becomes statically charged during operation of the array. The system also includes a controller operating to generate control signals to the array to independently operate each of the electrostatic generators to provide the static charge at first, second, and third voltages. In this manner, when positioned in a flight space above the array, the object is levitated above the array of the electrostatic generators by an electrostatic lifting force(s).

In some cases, each of the electrostatic generators is a high voltage Van de Graaff generator and the first, second, and third voltages are in the range of 0 to 300,000 volts such as 100,000 to 300,000 volts. Each of the electrostatic generators may include a variable impedance device optically-controlled by the controller. In some implementations of the system, the controller operates the array to cause the object to follow a flight path through the flight space by separately varying the first, second, and third voltages over time (e.g., the exposed and electrostatically charged elements may be charged with differing polarity and/or differing voltages to apply differing electrostatic forces on the levitating object).

In some cases, the system further includes a location tracking assembly that is operated by the controller for determining a position of the object in the flight space. Then, the controller generates the control signals based on the determined position and the flight path such as to correct flight of the object to direct it back onto the flight path. In such embodiments, the exposed element of each of the electrostatic generators may be a hoop, and the flight path may be through the hoops, Then, the first, second, and third voltages are alternated from positive to negative to take advantage of momentum to direct the object along a path through the hoops (from one generator to a next adjacent or neighboring one of the generators). The system may also be adapted for manual control over levitation by including a portable controller for one of the electrostatic generators. Then, a human operator may be positioned in contact with the exposed element (standing on a variable potential platform or plate) and can vary the first, second, or third voltage to manually control levitation of the object by operating the handheld or portable controller.

DETAILED DESCRIPTION

Figure 1:
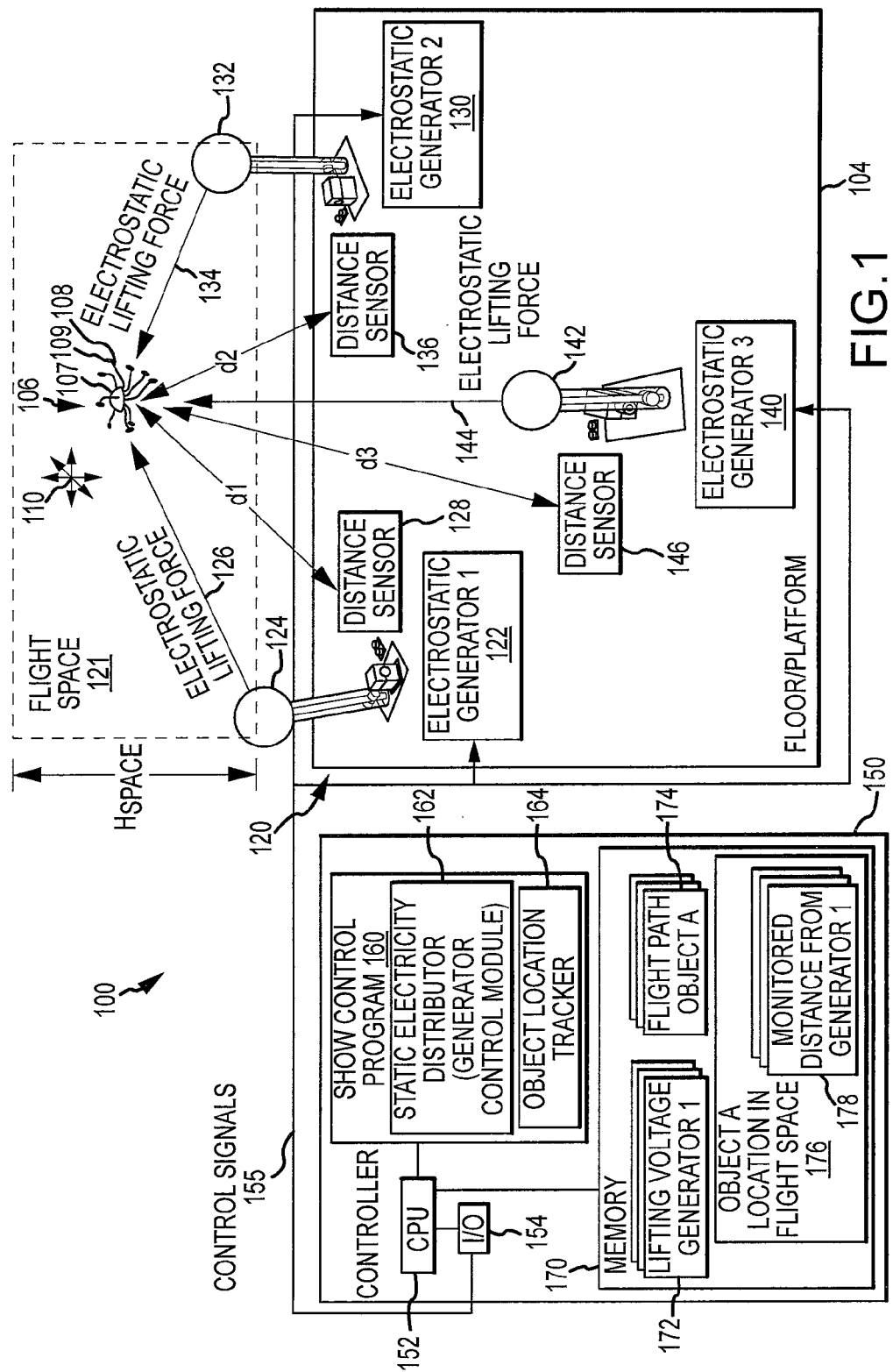
FIG. 1 is a functional block drawing of an electrostatic levitation system for levitating lightweight objects or show pieces in a controlled manner using an array of electrostatic generators.

The present description is directed towards methods and systems for levitating lightweight objects in selective and controlled manner through a show or flight space (or volume). Briefly, the objects are levitated using an array of electrostatic generators that can be operated or controlled such that a range of charge or voltage may be provided at each of a number of independently controlled electrostatically charged members or elements. For example, the charged members or elements may be metallic spheres or plates exposed to and facing the show or flight space such as in or on the floor or a lower platform or stage.

The flying object may take the form of a lightweight structure or body configured for receiving and carrying a static charge, e.g., an electrostatic charge with a polarity matching that of the charged member or elements of the array. A controller acts to selectively modify the magnitude of the charge (or voltage) at the charged members of the array such that the flying object with its charge carrying body or features is selectively repelled from the array of electrostatic generators so as to move in a desired pattern at selectable heights. The controller may send control signals to the electrostatic generators based on a comparison of determined location three-dimensional (X-Y-Z) position information for the flying object in the flying space with a desired flight pattern/path (which may be determined in real time such as to allow interaction with a human or robotic character or feature in the flying space or be predefined for a show or aerial display). In this manner, the flight of the flying objects is non-motorized and appears to be magical or at least organic/natural, and the flying object may be designed with a structure or features to appear to have movement or appear as a flying jellyfish or other desired appearance.

Prior to turning to specific implementations, it may be useful to provide an overview of the systems and methods for electrostatic levitation of lightweight show objects with large-area control. The inventor was aware of commercial toys with a battery-powered, high-voltage Van de Graaff generator in the form of a hand-held baton or wand and with a tinsel toy with a mesh body formed from strands of Mylar® or similar materials capable of being statically charged. The baton or wand generates a static charge that allows a user to levitate the tinsel flying toy by pressing a button (on/off switch in the baton), and the toy is advertised as teaching children about the power of static electricity and the repulsion of like charges (e.g., the wand may create a positive static charge at about 20 to 30 kV while the tinsel toy can be charged by the wand to carry a positive static charge). The baton is only capable of on and off operation when operated by a user, but, with some practice, the user can use the wand to levitate lightweight but relatively large (e.g.,6 to 12 inches or more in diameter structures) from 4 to 8 feet above the tip of the baton.

Experiments with this commercial toy led the inventor to recognize that control of a lightweight flying object can be controlled through the use of a Van de Graaff generator (or, more generally, an electrostatic generator). Control, though, required carefully switching the wand on and off at the correct times and quickly and accurately moving the wand relative to the flying object to redirect it and to counteract for wind or other disturbances in a space.

The inventor determined that basic electrostatic levitation could be provided through the use of a single, electrostatic generator that was configured to provide higher control over the voltages (or static charges created). With the electrostatic generator fixed in place, the height of the flying object, which is charged to some potential and the same polarity as the electrostatic generator (or its exposed charged member/element), and the flying object could be made to float above the electrostatic generator at heights set by the voltage of the electrostatic generator. By using a much higher voltage generator than found in the wand toy, a much greater repulsive (or lifting) force could be generated and the flying object could be larger and/or be moved through a greater range of heights above the generator. While such an arrangement provided height control, the flying object's flight was unstable and as soon as the object drifted away from a location directly above the generator (or its electrostatically charged element the object would quickly drop to the ground (no repulsive charge to prevent its fall)).

With these concepts in mind, the inventor proposes use of an array of spaced-apart electrostatically charged elements or pads (or electrodes) to controllably levitate lightweight objects or pieces. For example, the lightweight objects may have bodies and/or portions formed of metalized Mylar®, and the electrostatically charged electrodes may be provided in or on a floor of a show area or platform of a stage. Such an arrangement is safe because the electric fields are large, but the available currents are minute. The array of static electricity pads can be operated to stably lift and controllably fly one object or multiple objects simultaneously over relatively large areas such as a small stage-sized area.

Objects can be suspended at extended heights based on static voltage and be moved gracefully through a space such as over a stage or on a show set. Moreover, a cast member can stand on one or more of the charged elements or pads and control to some degree flight of the objects as they become charged by element/pad, which makes it possible for them to maneuver one or more flying objects as they fly over them by using simple movements of their hands, arms, shoulders, and head under the object (as these movements redirect or modify the static charge repelling the object flying over the cast member or system operator).

Further, the operator or cast member may be provided a control input device (e.g., a handheld device) that allows them to modify the charge on a particular pad/element. Then, for example, the cast member or operator can vary the levitation height of the object over their person by increasing or decreasing the static charge applied to their body by the pad/element, which can even be used to cause the object to stop flying and land on the cast member or operator (e.g., reduce static charge to the point where the repulsion forces are not high enough to lift the object off of the pad/element or the now-statically charged cast member or operator). Such control over the pad/element and its associated high-voltage electrostatic generator may also be achieved by an offstage operator or by a show control program operating to provide predefined control over the flying objects and/or to provide control based on a present location of the flying object(s) within the monitored space.

In this way, one or more objects (e.g., a swarm) can be caused by the selective control of the charge on the pads/elements to put on an autonomous performance through the use of the static electricity array and its controller (e.g., running a show control program to define flight patterns for the objects). These concepts may be combined with a first set of objects being controlled by an onstage performer/operator while a second set of objects is caused to continue to follow predefined flight paths/patterns by the controller running the show control program. In other cases, members of the audience may be allowed to participate in control of the flying objects such as by providing the audience an input device (e.g., a joystick) whose outputs are processed by the controller to adjust/control flight of one or more of the flying objects via the array of electrostatically charged pads/elements/electrodes or by tracking movement of their hands and/or arms such as with camera tracking and using the determined audience member movements to modify flight of one or more of the flying objects.

In one embodiment, the pads/elements/electrodes are provided as metallic square plates that are approximately 1 foot on a side and spaced apart about 6 inches on a side to provide a square grid that may be provided across the whole or a portion of a stage or platform. The controller may take the form of a computer with a processor running the show control program, and the controller may include a central static electricity distributor (e.g., a module of the show control program) that acts to transmit control signals to high-voltage electrostatic generators associated with each of the pads/elements/electrodes to set the static charge (or voltage) and polarity of the static charge of each of these pads/elements/electrodes during a show or display. The individual trajectories or flight paths of the flying objects can be monitored by the controller via video tracking or other position monitoring equipment, and the show control program can respond to the present detected positions of the objects to apply corrected voltages to each electrode/pad/element to independently control movement of each flying object as part of a choreographed show (defining flight paths/patterns for each of the flying object in some embodiments).

With this overview in mind, it may now be useful to discuss, with reference to figures, the use of an array of independently and selectively controlled electrostatic generators to not only cause a lightweight object or show piece to float or fly in a space above the generators but also to cause the lightweight object to follow a desired flight path or move in a directed pattern. The following discussion begins with an exemplary electrostatic levitation system with explanation of a useful controller and then continues with a number of differing embodiments or implementations of levitation systems (with an assumption that the controller of the system could be used in any of these other embodiments of levitation systems).

FIG. 1 is a functional block diagram of an electrostatic levitation system 100 that is generally made up of three components: an array 120 of electrostatic generators 122, 130, 140 that may be mounted on a floor or platform 104; a controller 150 for selectively operating the generators 122, 130, 140; and one (or more) lightweight objects 106. The electrostatic generators 122, 130, 140 are configured to respond to control signals 155 from the controller 150 to generate a static charge with a given polarity (positive or negative) and voltage (e.g., a high voltage of 100,000 to 300,000 volts or the like in some cases) on an electrostatically charged member or element 124, 132, 142. These charged elements 124, 132, 142 may take the form (as shown) of metallic spheres (e.g., hollow aluminum spheres) or other body shapes such as plates. In this way, each of the electrostatic generators 122, 130, 140 provides an electrostatic lifting force 126, 134, 144 that can be set to be the same or to differ by the control signals 155. In some cases, the electrostatic generators 122, 130, 140 take the form of a Van de Graaff generator with a moving belt to accumulate high voltages on the hollow metal globes 124, 132, 142 on the top of an arm or stand (e.g., with the charged globes being exposed in or at the bottom of a flight space or volume 121 above the array 120).

The lifting forces 126, 134, 144 repel the lightweight object 106 because the lightweight object 106 is adapted to receive and store (e.g., to be charged) a static charge (again, with relatively high voltage) with the same polarity (i.e., positive or negative) as the electrostatically charged elements 124, 132, 142 of the generators 122, 130, 140. For example, the object 106 may include a body 107 with one or more metal or metalized surfaces (e.g., a metalized Mylar® body or portions of the body) that can be charged by static electricity. In some cases, it is desirable for the object 106 to appear to move organically or to be ephemeral in nature, and, to this end, the object 106 may include tendrils, tentacles, appendages, or wing-elements 108 extending outward from the body 107. Pads 109 may be provided at the end of the elongate elements 108 that are adapted to also store a charge (e.g., a small sheet of metallic material or, again, metalized Mylar® or the like). The pads 109 are typically charged with static electricity with the same polarity as the body 107 such that these components of the object 107 repel each other when charged and in use so as to "inflate" or self-assemble into a more voluminous structure as each of the elements 108 and their corresponding pads 109 remain spaced apart during flight (and are separately repelled by the lifting forces 126, 134, 144 so the object 106 shown in FIG. 1 may take on the appearance of a swimming jellyfish or the like during operation of the system 100). In many cases, the objects 106 can be caused to levitate at heights, $H_{space}$, up to 10 feet or more above the elements 124, 132, 142.

Significantly, the voltages at each element 124, 132, 142 are set by the control signals 155 from the controller 150 so as to move the object 106 in any direction as shown at 110. The movement 110 can be stable and controlled (unless free fall is desired) so as to cause the object 106 to follow a flight path or pattern by varying the voltages at elements 124, 132, 142. For example, the voltage may be increased at element 132 by operation of the electrostatic generator 130 to force 134 the object 106 to move up and away 110 from the element 132 (and toward the other elements 126, 142 which may be controlled to have lower voltages at that particular time in operation of the system 100).

To provide such control over the flight of object 106, the system 100 includes the controller 150 that operates to generate the control signals 155. The controller 150 may take the form of a computer (or other electronic device) that is adapted to act as a special-purpose computer including functioning to generate the signals 155. The controller 150 may include a processor 152 that executes code or instructions to perform the functions described herein including running or executing a show control program 160. Further, the controller 150 manages input/output devices 154, which may include a wireless transceiver for communicating 155 with the generators 122, 130, 140 to operate the generators and also to receive object location/position information. The I/O devices 154 may also include devices for allowing an operator to initiate the show control program 160 and/or for setting or adjusting flight paths for the object 106. In some cases, the operator is able to use the controller 150 to operate the generators 122, 130, 140 to move the object 106 through the flight space 121 in a real time basis while in other cases the flight paths for the object 106 may be predefined.

The processor 152 may also manage memory/data storage (e.g., non-transitory computer-readable medium) 170. As shown, the memory 170 is used to store at 172 operational settings for the electrostatic generators 122, 130, 140, and these settings may include lifting voltages or operation ranges for the generators 122, 130, 140 for achieving various lifting forces 126, 134, 144. The voltages 172 of each generator 122, 130, 140 may be equal during a show/display but often will differ from each other and will vary over time to move 110 the object 106 through the space 121. The show control program 160 includes a static electricity distributor (or generator control module) 162 that selectively generates the control signals 155 to operate the generators 122, 130, 140 based on the lifting voltages or other operational settings 172.

The distributor 162 may be designed to issue the control signals 155 to cause the object 106 to follow a predefined flight path 174 through the space 121 over the generator array 120. In some embodiments, the operation of the generator array 120 is adjusted in real time or on an ongoing basis during a show program 160 to account for a present location of the object 106. For example, conditions in the space 121 such as air movement may cause the object 106 to drift away from the flight path 174 and the distributor 162 may adjust the voltages 172 of one or more of the generators 122, 130, 140 to correct the movement of the object 106 (e.g., to return it to or toward the flight path 174). To this end, the show control program 160 may include an object location tracker 164 that operates to determine a location of each object 106 in the space 121 at a particular point in time. This location 176 may be stored in memory 170 and used by the control program 160 to operate the generator array 120 to attempt to cause the object 106 to follow a flight path 174 with lifting or levitation forces 126, 134, 144 (by varying lifting voltages 172).

The location of the object 106 may be tracked in a variety of ways to practice the system 100. As shown, a distance sensor 128, 136, 146 may be provided at or near each generator 122, 130, 140 to determine relative distances between these generators and the object 106 as shown at $d_1$, $d_2$, and $d_3$ in FIG. 1. This distance information 178 may be provided to the controller 150 for processing by the object location tracker 164 to determine (e.g., via triangulation or other techniques) the X-Y-Z (or three dimensional) location or position of the object 106. This position or location (e.g., object in flying space 176) can be compared with the flight path 174 for that particular object by the show control program 160. Then, as necessary to maintain the object 106 on the flight path 174, the static electricity distributor 162 can modify the operation of one or more of the generators 122, 130, 140 over time to move 110 the object 106 by varying the electrostatic lifting forces 126, 134, 144 (by changing the voltages on the electrostatically charged elements 124, 132, 142).

The system 100 of FIG. 1 is shown to include three electrostatic generators 122, 130, 140 arranged in a triangular-shaped array 120. In practice, though, the number and location of the generators may be widely varied. Similarly, one object 106 is shown for simplicity, but it should be understood that two or more objects 106 may be provided in the system and controlled to follow differing flight paths 174 with each having their location 176 tracked by tracker 164. The objects 106 may all have the same configuration or structure in some cases (a swarm of floating or swimming jellyfish-like creatures) while other cases may include one or more objects with differing structures (a larger object that can be controlled manually or automatically and a swarm of smaller objects moving in a swarm (e.g., a single or matching flight path)).

Figure 2:
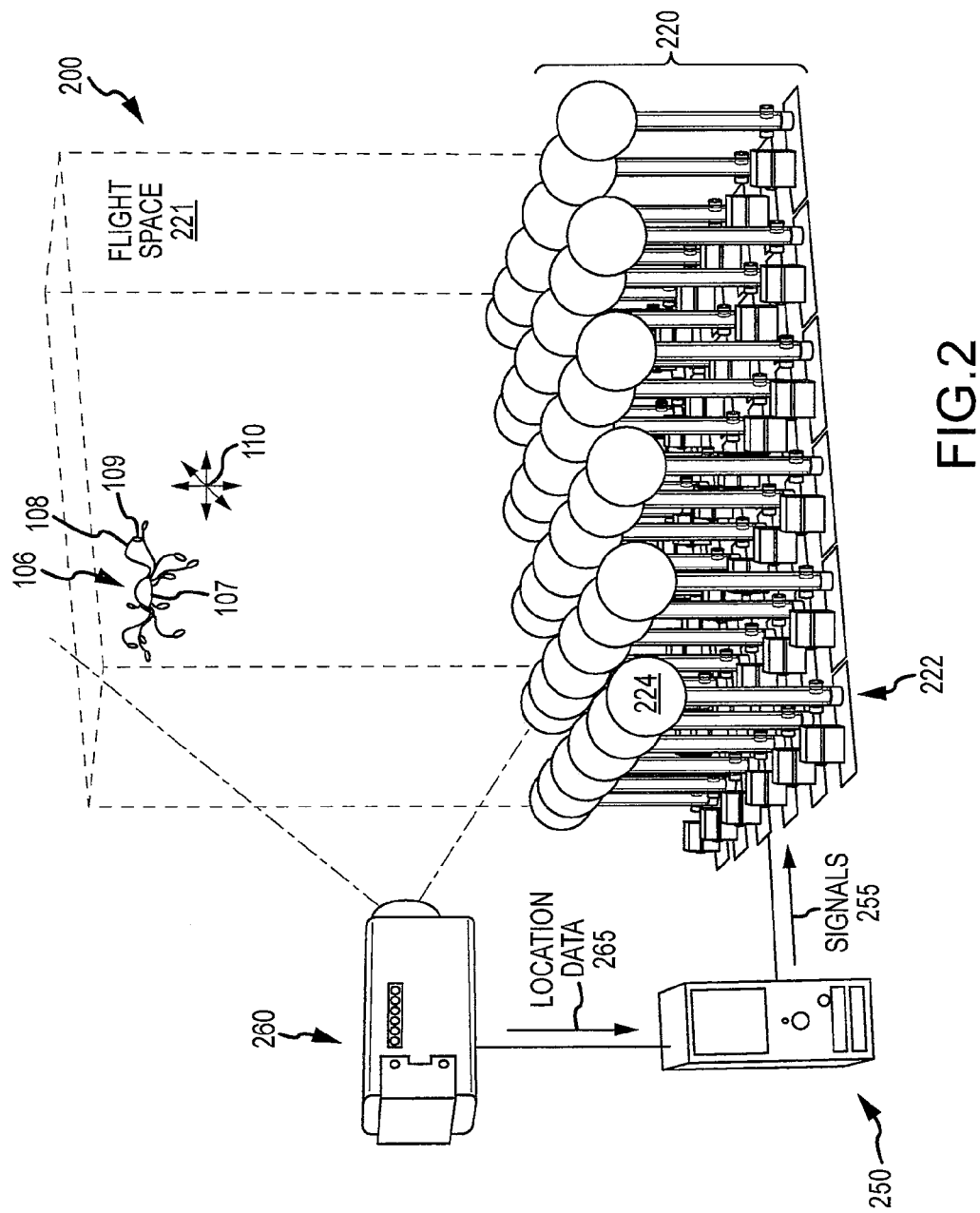
FIG. 2 is a partial (and simplified) side view of another electrostatic levitation system similar to the system of FIG. 1 but using a differing array of electrostatic generators and a different object location technology.

FIG. 2 illustrates another embodiment of an electrostatic levitation system 200 that can be used to selectively move 110 the object 106 through a flight space 221 above an array 220 of electrostatic generators 222. In the system 200, there are many more generators 222 than shown in the system 100, and this is useful for showing that the generators 222 may be provided in nearly any number that is useful to define a base or lower portion of a desired flight space 221. For example, the generators 222 may be arranged in a square array of rows and columns, with a 6 by 6 array shown as one embodiment but not as a limitation, to provide a flight space 221 with a square cross sectional shape (e.g., to support a square stage or show platform). Each of the generators 222 includes an electrostatically charged element 224 (e.g., a hollow sphere or plate), and the generators 222 are arranged, in this example, to define a planar surface from which a plurality of repelling or lifting forces can be provided to levitate and move 110 the object 106 in space 221.

The lifting forces can be separately controlled or set in magnitude by control signals 255 from a controller 250 (e.g., a computing device running one or more programs to perform the functions described herein). In practice, the use of the array 220 with the controller 250 allows each of the generators 222 to be independently addressable and controlled to set the lifting force (or voltage) at each electrostatically charged element (or surface) 224. A video camera 260 is provided in the system 200 and directed/focused into the space 221. The camera 260 is used to obtain tracking or location data 265 that is passed or communicated to the controller 250 for determination of the present location of the object 106 in the space 221. Based on the determined location of the object 106, the controller 250 can generate control signals 255 to operate one or more of the generators 222 in the array 220 to control movement 110 of the object 106, e.g., to follow a flight path or to move the object to a specific location or in a desired manner (quickly up and down or side-to-side) in the flight space 221.

Figure 3:
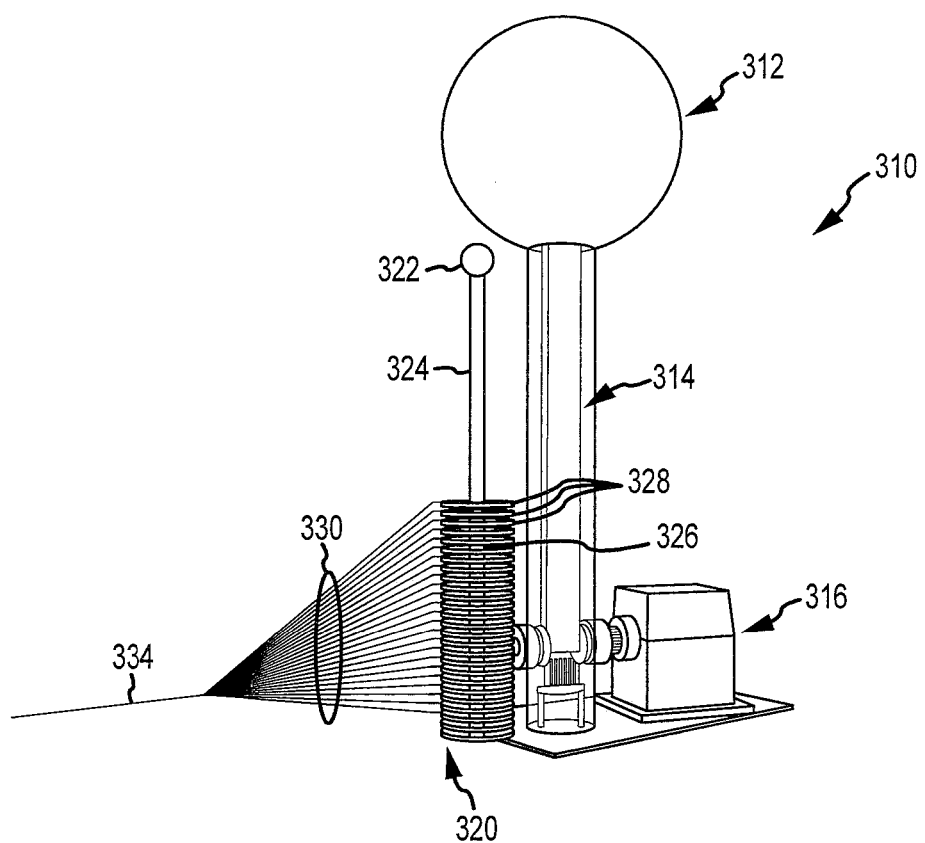
FIG. 3 is a perspective view of one exemplary electrostatic generator that may be used in an array of electrostatic generators such the arrays in the systems of FIGS. 1 and 2.

As discussed above, nearly any electrostatic generator may be used in the levitation systems to levitate a lightweight object that is configured to carry a static charge. For example, FIG. 3 illustrates an exemplary electrostatic generator 310 that may be used in an electrostatic levitation system. The generator 310 includes a hollow metallic sphere (e.g., an aluminum sphere) 312 attached to the end of a hollow tube/arm. A belt 314 that carries or transfers a static charge to the sphere 312 extends in this tube and is moved by the motor 316 between upper and lower electrodes of the generator 310.

A variable load control assembly 320 is provided in the generator 310 to provide an effective technique for remotely and rapidly controlling the voltage provided at the electrostatically charged element 312. Particularly, the control assembly 320 is configured to provide optically-controlled variable impedance to provide control over the high voltage provided at the element 312. In the example shown in FIG. 3, the control assembly 320 is implemented with a conductive rod 324 extending up to an end upon which a load electrode 322 is mounted. At the opposite end of the rod 324, alternating interstitial photoresistors (CdS or the like) 326 and insulating plates 328 are provided, with the plates 328 provided to prevent spark through from occurring during operation of the generator 310. A plurality of optical fibers 330 are run to the resistors 326 (which combine to provide an optically variable resistor). The photoresistors 326 are each light variable resistors and an input modulated light source (e.g., a laser, an LED, or the like) is provided on optical fiber line/cable 334 to rapidly adjust or control the voltage provided at element 312 by the electrostatic generator 310. Alternatively, free space optical communication with the optically variable resistors can be employed. A video projector (not shown) may be used to communicate with the entire array to directly set the potential of all of the generators simultaneously at video frame rates. In this way, an array of the generators 310 may be independently and selectively operated to provide a high voltage within a voltage range (e.g., 0 up to 100,000 to 300,000 volts or the like) to apply a lifting force on a like charged object levitating above the element 312. The generator's output can be controlled by other means, such as by increasing or decreasing the belt speed of the generator, by increasing or decreasing the capacitance of the output electrode to ground, by controllably series connecting several generators of lower voltage to create aggregate larger or smaller voltages, or by series connecting a larger static voltage supply with a smaller variable one.

Figure 4:
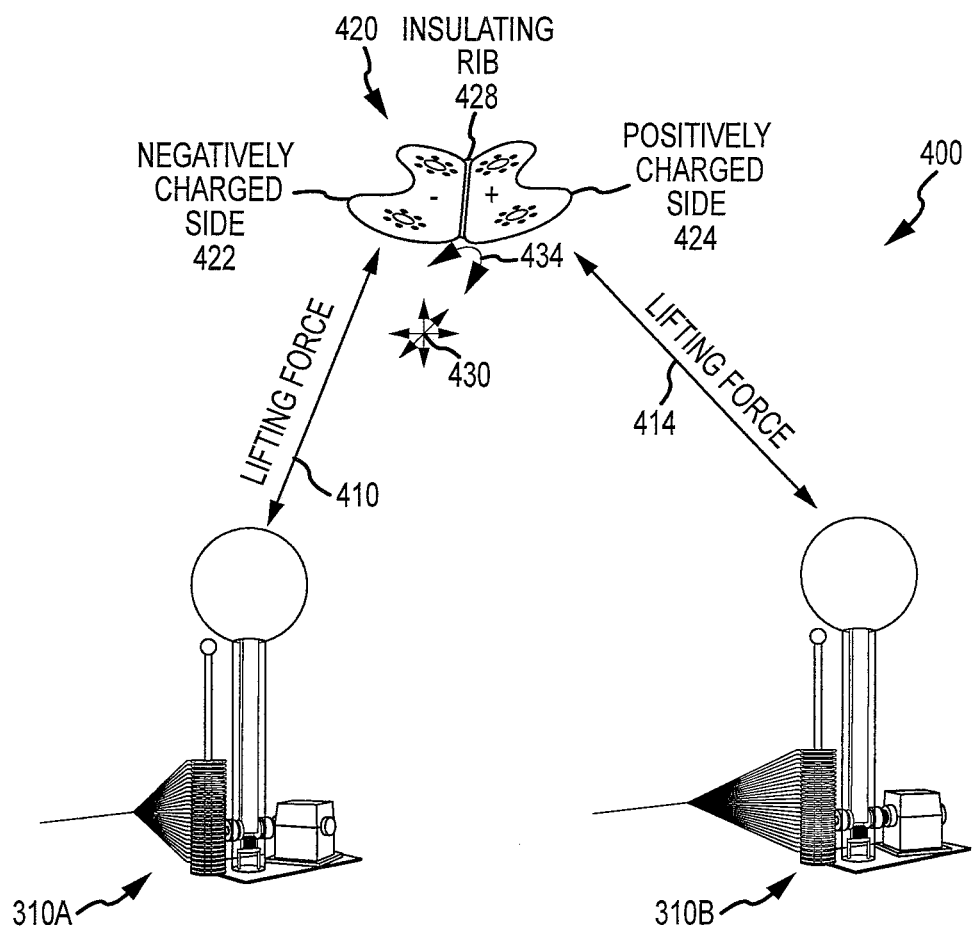
FIG. 4 shows an electrostatic levitation system configured to allow selective spinning of a levitated object through the use of an array of electrostatic generators (such as the generator shown in FIG. 3)

At this point in the description, it may be useful to explain how a variety of levitation effects and control over objects may be obtained through the use of electrostatic generators such as generator 310 when combined with a variety of implementations of the charge-carrying object. FIG. 4 illustrates an electrostatic levitation system 400 that includes an array of generators, with two generators 310A and 310B shown for ease of explanation but it being understood that more generators typically are included in an array. The generators 310A and 310B may take the form shown in FIG. 3 and may be operated to provide a commutating positive and negative lifting force 410, 414.

The generators 310A and 310B are controlled in this alternative polarity manner to use positive and negative charge on a levitated object to cause the object to spin. As shown, in FIG. 4 the object 420 is shown to include a body made up of a first side 422 and a second side 424 separated by a rib 428, and the two sides 422, 424 are formed to be able to receive a static charge (e.g., a sheet of metal or a sheet with a surface that is metalized). The rib 428 is formed of a ceramic, rubber, or other material so that it functions as an electrical insulator. In this manner, the first side 422 may be negatively charged while the second side 424 is positively charged (i.e., the first and second sides are charged to have opposite polarity). As a result of these two oppositely charged sides 422, 424, the object 420 may be levitated and moved in a directed manner as shown at 430 by the lifting forces 410, 414 and also be caused to spin as shown at 434 by switching between positive and negative charges at the electrostatically charged elements of generators 310A and 310B.

Figure 5:
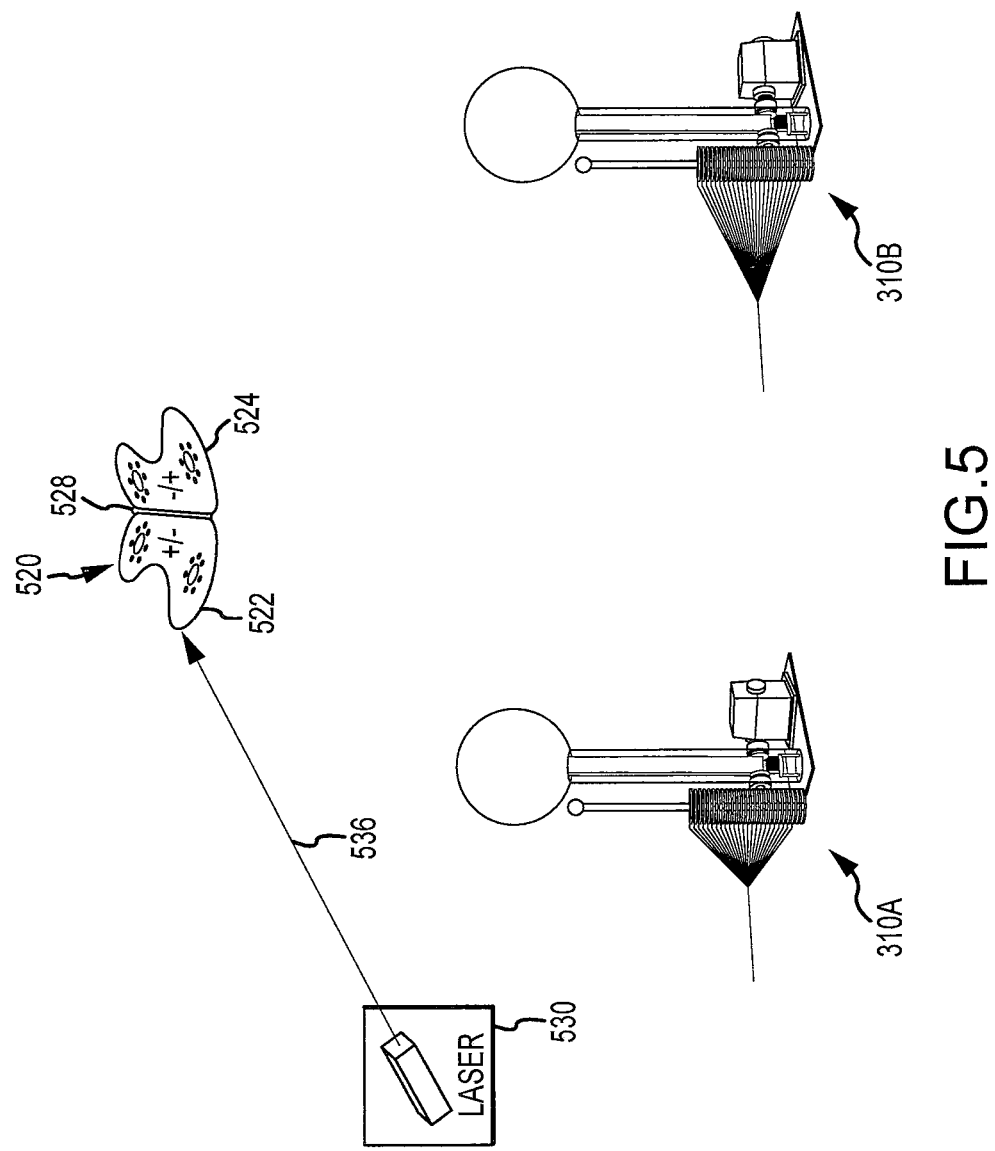
FIG. 5 illustrates another electrostatic levitation system similar to that shown in FIG. 4 but including an object configured with sections that have charge polarity optically controlled.

FIG. 5 illustrates another electrostatic levitation system 500 that uses electrostatic generators 310A and 310B to lift, position, and/or spin an object 520. The object 520, in the system 500, is adapted with a body having two or more sections separated by an insulating rib(s). As shown, the body has a first side 522 and a second side 524 separated by an insulating rib 528. Each side 522, 524 is adapted to receive and store a static charge (e.g., a metalized surface or the like). Further, in contrast to the object 420 of system 400, the object's sides 522, 524 are provided as optical sections that can have the polarity of the stored charge switched such as by CDS or a neon bulb that is under laser control. To this end, the system 500 includes a laser 530 for selectively targeting the object 520 with collimated light 536 to affect a change of the charge on the floating or levitating object 520. In this way, the commuting of the generators 310A and 310B becomes optional, and the system 500 can be operated to levitate, spin, and otherwise move the lightweight object 520 using high voltage electrostatic generators 310A, 310B.

Figure 6:
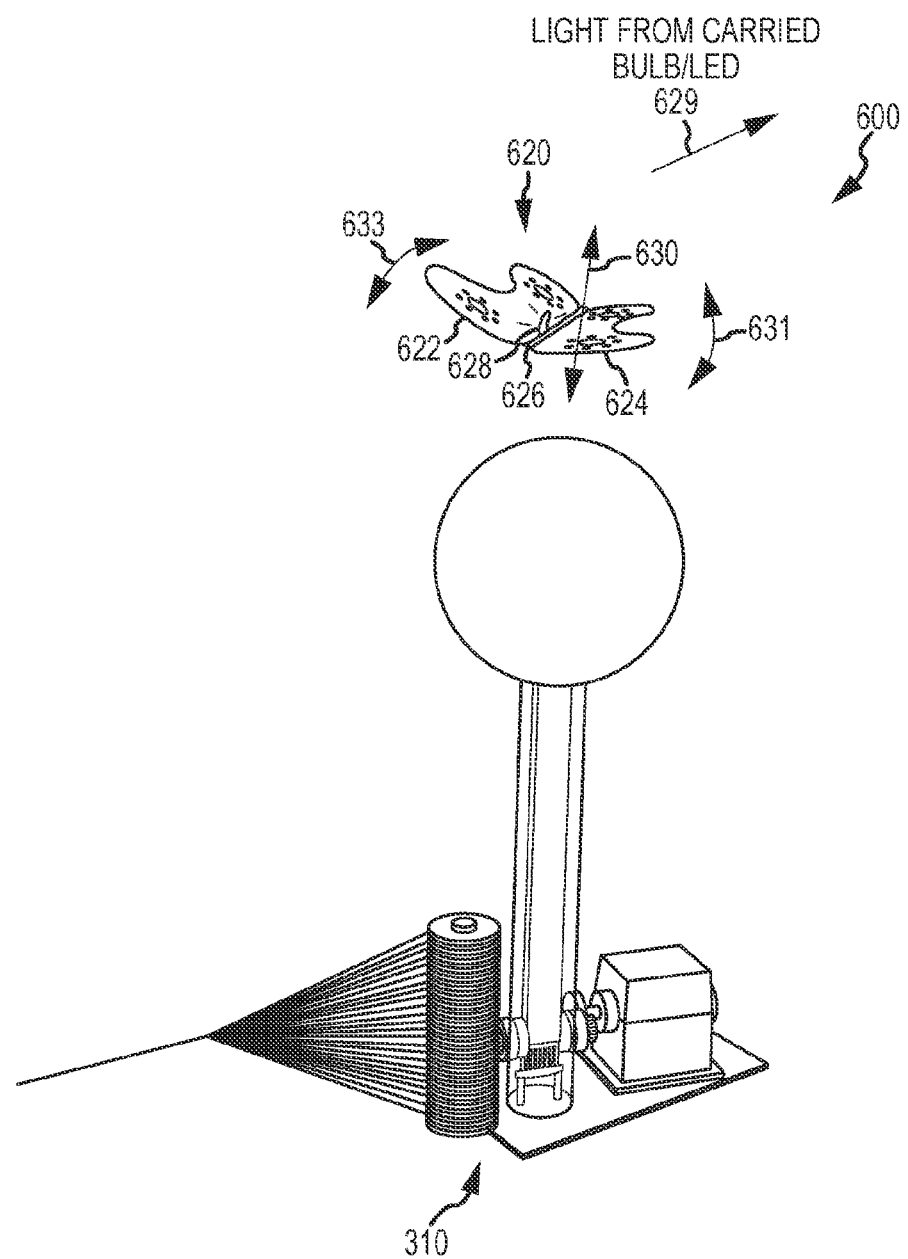
FIG. 6 illustrates a partial view of an electrostatic levitation system (e.g., with a reduced number of electrostatic generators) that is operated to transmit animation to the flying object, which is configured for self-illumination.

FIG. 6 provides a portion of an electrostatic levitation system 600, e.g., a "portion" because only one electrostatic generator 310 is shown when three or more typically would be included in an array of such generators 310. The system 600 is adapted for transmitting animation to a levitated object and also to provide lighting or display effects by providing lighting elements on the body of the object.

To this end, the system 600 includes an object 620 with a body made up of first and second sides 622, 624 (or left and right wings) separated by a rib/hinge 628 (that may be an insulating element as discussed above). Then, during operation of the system 600, the generator 310 may be operated so as to animate the object 620. This may involve switching the generator 310 on and off or alternating between a first voltage to a second voltage that differ a relatively large amount (e.g., 10 to 50 percent difference or drop/rise). Such operations of the generator 310 can be used to cause the wings/sides 622, 624 to move up and down (or flap) or become animated as shown at 631, 633. The changes in the electrostatic lifting force can be used to cause the flapping 631, 633 such as one-to-many times per second or the like, which may allow the object 620 to appear to be a natural/organic object flying in a space above the generator 310.

Further, the body may support one or more light sources 628 such as light bulbs or light emitting diodes (LEDs). These light sources 628 may be used generate a light 629 to illuminate the object 620. The light source 628 may be configured to be powered by the lighting force or field provided by the generator 310 (or array of such generators 310). For example, the lifting field/force from generator 310 may be a DC field and the neon bulb/LED 628 lights as shown at 629 when exposed to a predefined voltage (e.g., a high voltage of 100,000 volts or more in the DC field from generator 310). In some embodiments of the system 600, an A/C field generator (not shown but may take the form of a Tesla coil or the like) may be included in the generator array with the generator 310 to supplement the DC lifting field and independently power the bulb/LED 628. In this manner, the lighting 629 may be provided by the light source 628 separately from the lifting by generator 310 to animate 631, 633 and lift the object 620.

Figure 7:
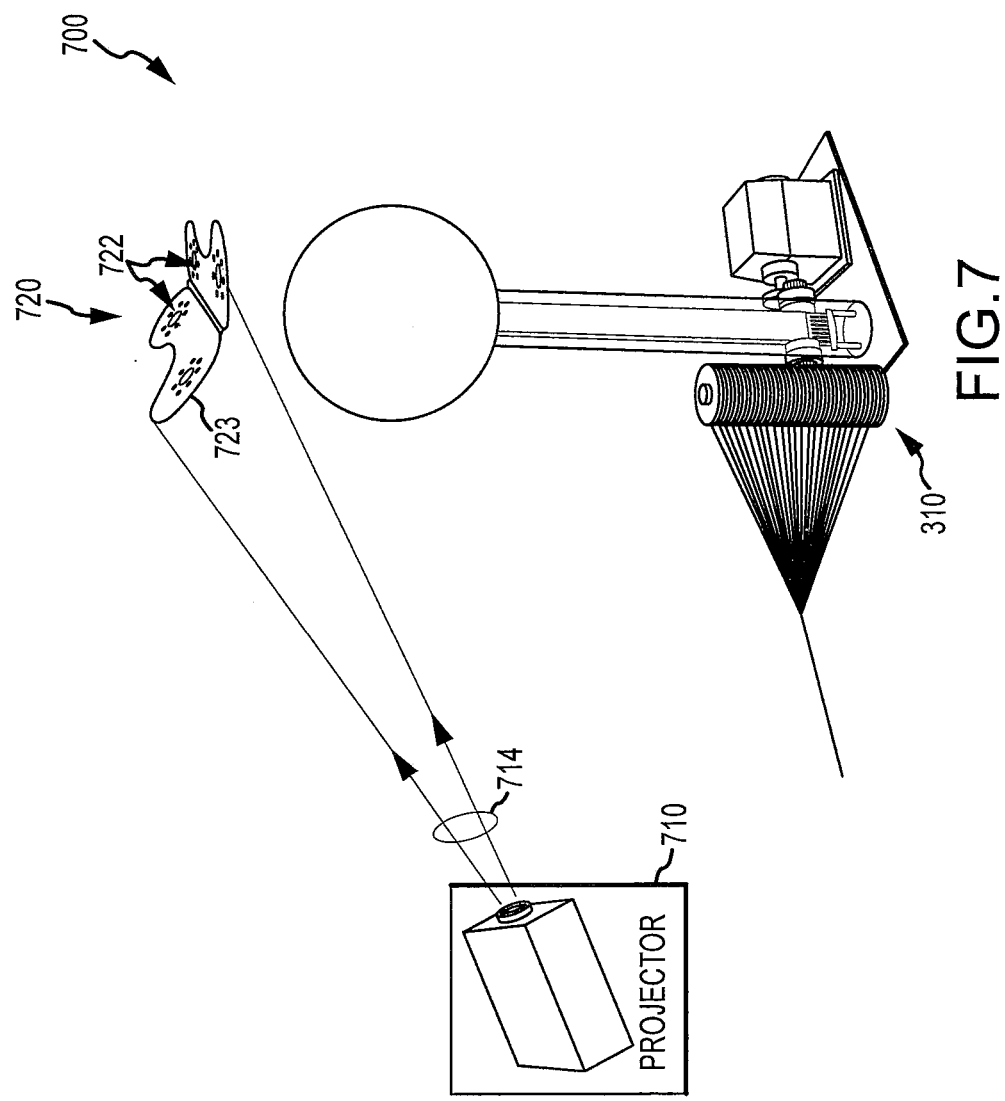
FIG. 7 illustrates another partial or simplified view of an electrostatic levitation system similar to that shown in FIG. 6 that includes a projector projecting onto the flying or levitated object, which optionally includes lower or exposed surfaces covered with fluorescent paint.

FIG. 7 illustrates another implementation of an electrostatic levitation system 700 that is adapted to provide differing light-based special effects. In the system 700, a lightweight object 720 is provided with a body 722 that is adapted to be statically charged, such as with a charge having a polarity matching that provided by the electrostatic generator 310

(or any of an array of such generators) to lift and direct movement of the object 720. The object 720 may have one or more surfaces 723 that are suited for receiving light 714 from a projector 710. The light 714 may be visible light that is projected by a visible light projector 710. This visible light may be used to alter the outward appearance of the levitating object (make it colorful, give it the appearance of a true organic flying creature, and so on) according to show or other needs.

In some cases, it may be desirable to limit back lighting during operation of the system 700. In these embodiments of system 700, the projector 710 may be an ultraviolet (UV) light projector such that the light 714 is UV light. The object 720 then may include the surface 723 that is painted or covered with (or include) UV fluorescent paint such that this surface 723 or UV painted portions are visible to an audience/viewers when the projector 710 strikes the object 720 with the UV light 714 but with no back light issues to detract from the lighting and aerial display provided by the system 700.

Figure 8:
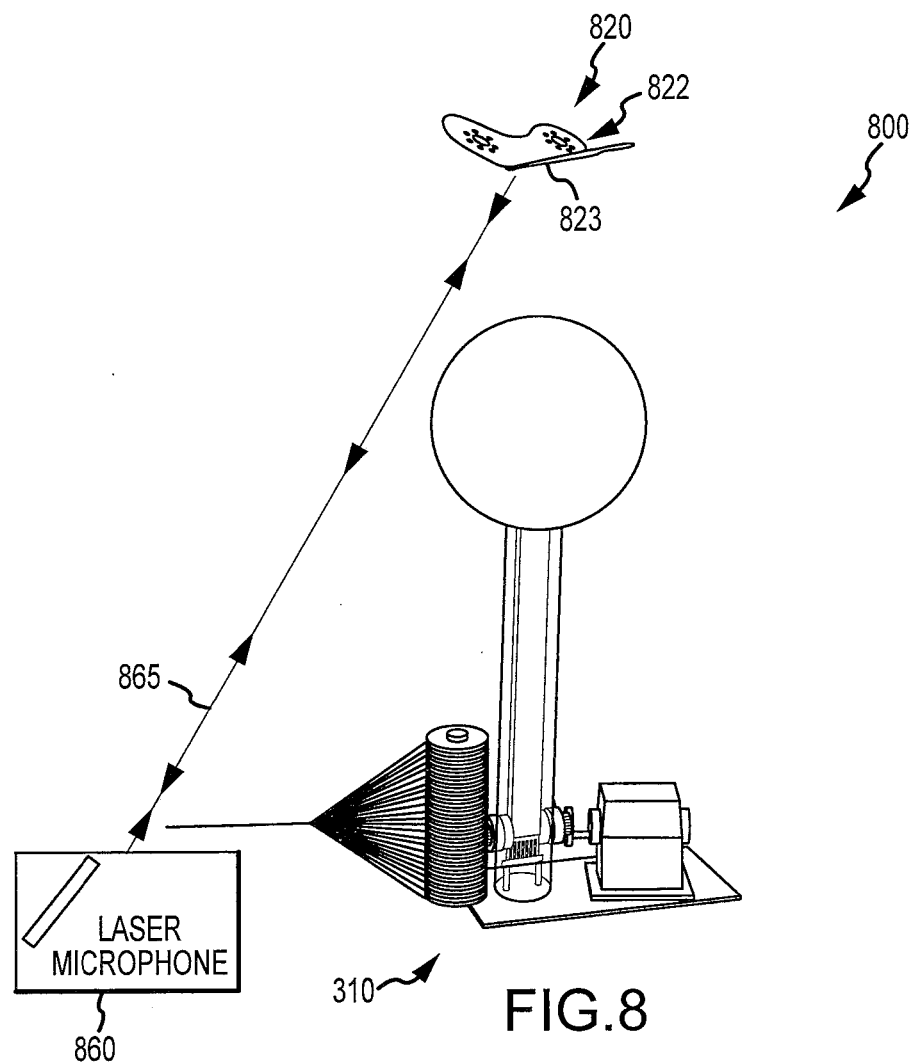
FIG. 8 shows a portion of an electrostatic levitation system adapted for using laser reflections to detect sound vibrations.

FIG. 8 illustrates a portion of an electrostatic levitation system 800 that is adapted to provide audio effects with a levitated object 820 lifted and moved by an array of electrostatic generators 310. Such an audio output may be provided by configuring the object 820 as levitating optical microphone. To this end, the object 820 may include a body 822 adapted for receiving a static charge to support electrostatic levitation by generator 310. Further, though, the body 822 may include a surface 823 that acts to detect and/or reflect sound vibrations, and the surface 823 may take the form of a metallic reflective or retroreflective surface. The system 800 is also shown to include a laser microphone 860 that directs collimated light 865 onto the surface 823 and by. By demodulating returned light altered by the vibrations of surface 823 to create, the system 800 creates an audio output.

Figure 9:
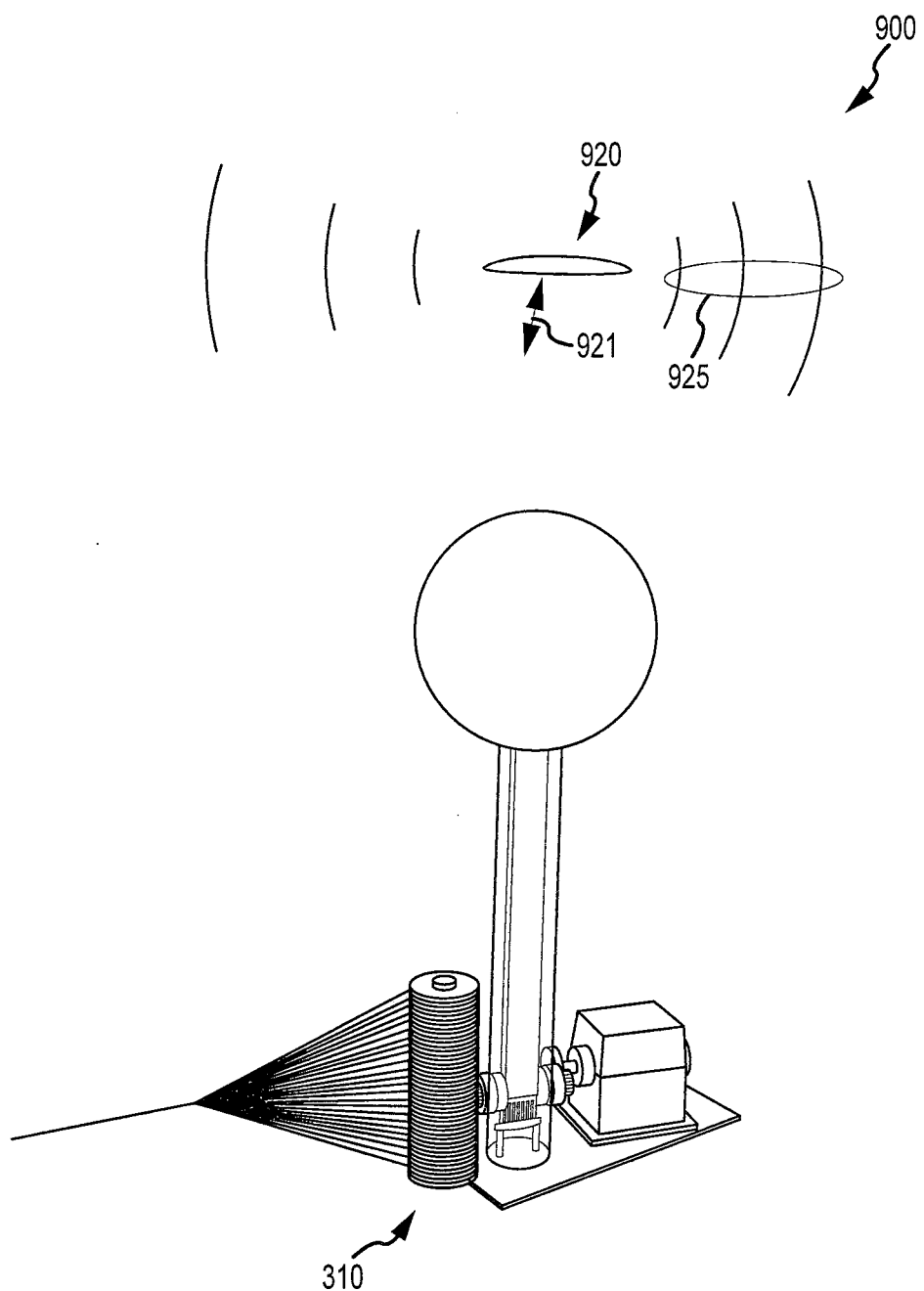
FIG. 9 illustrates a portion of another electrostatic levitation system operating to transmit sound via vibrating electrostatically lifted objects.

The inventor recognized with the use of electrostatic levitation a number of other techniques may be used to transmit audio to or with the levitated objects. For example, the system 900 shown in FIG. 9 includes an object 920 with a body configured especially to emit sound when it is vibrated in a particular manner or in a range of frequencies. With this in mind, the generator 310 may be operated in an oscillating manner (on/off or higher voltage/lower voltage) so as to levitate the object 920 but also cause it to vibrate 921. The vibration 921 may be at a relatively high speed that is adapted to cause it to resonate and make one or more noises (emitted sounds) 925 that can be heard by spectators viewing the system 900. To this end, the body of the object 920 may be a metal plate "tuned" to vibrate at particular resonant or nearby frequencies that can be achieved by rapid changes in voltage by the generator 310. The vibrations 921 may be accompanied by relatively small changes in the height of the object 920, e.g., less than an inch of height change when vibrated 921 to create sound output 925.

From the discussion of FIG. 1, it will be understood that the electrostatic generator array may be selectively operated to cause the levitated object to follow a particular flight path or pattern. This flight path may involve a number of changes in height (movement in the Z direction) as well as left and right positional changes (movements in the X and Y directions). In some cases, it may be desirable to position the electrostatic generators in a particular pattern and, if useful, further adapt the generators to direct and levitate the object along a flight path or through a flight space.

Figure 10:
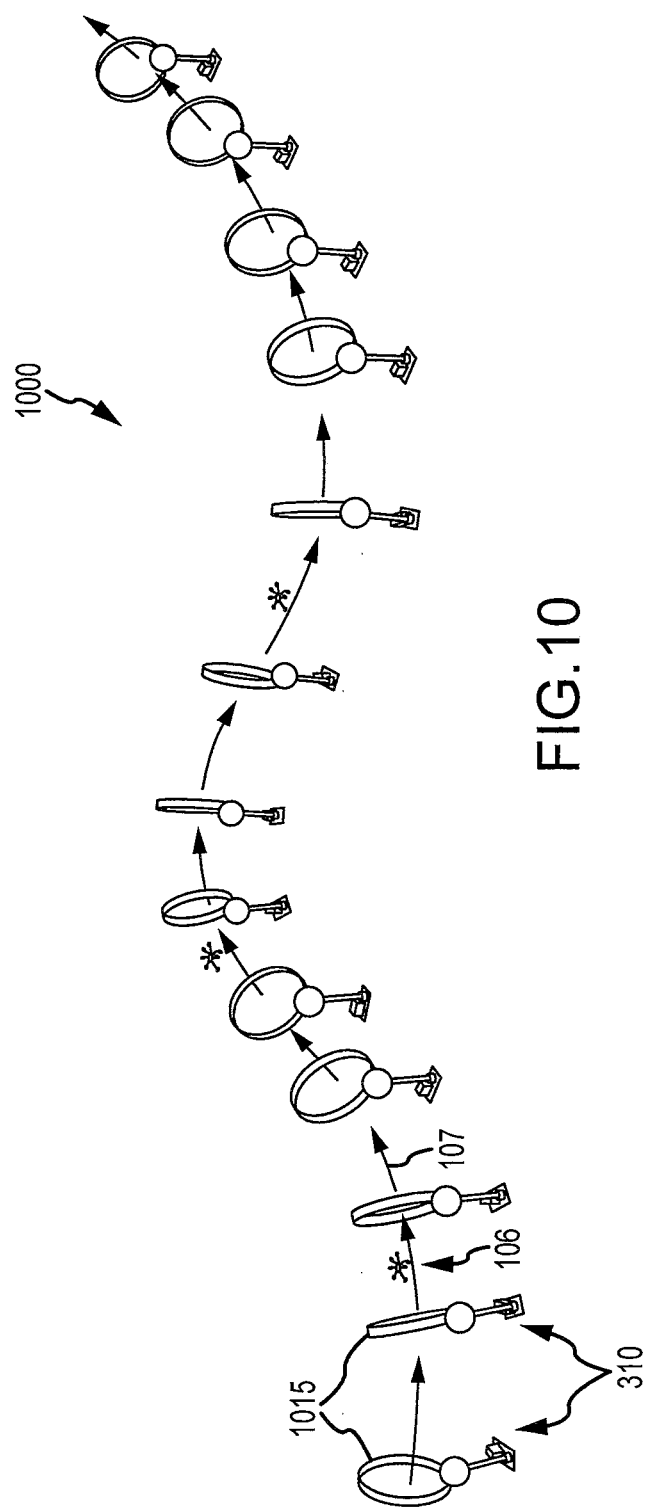
FIG. 10 illustrates an electrostatic levitation system with hoops provided on the electrostatic charge elements or electrodes on each of the electrostatic generator array that are operated to provide hoop polarity commutation to direct levitated objects along a flight path through the hoops.

For example, FIG. 10 illustrates an electrostatic levitation system 1000 adapted to cause an object 106 to follow a flight path or pattern 107 through the selective operation of the electrostatic generators 310. The path/pattern 107 may relatively linear with the object 106 being forced to hop or float from one generator 310 to a next or adjacent neighbor along the line 107. Each of the generators 310 may include a metallic hoop 1015 extending upward from or provided as an integral part of the electrostatically charged element. The hoop 1015 may be arranged to have its central axis parallel (or nearly so) to the ground or plane of the platform on which the generators 310 are mounted or supported.

Path-following electrostatic levitation is then provided by the system 1000 by operating the generators 310 with hoop polarity commutation (alternating the hoops 1015 between static charges with positive and then negative polarity). In this manner, the object 106, which is statically charged to have positive or negative polarity, is alternatively attracted to and repelled from each of the hoops 1015, and the object 106 can be forced to move through the hoops 1015 by taking advantage of momentum of the object 106 as shown with arrow 107 (e.g., the flight path is through the center of the hoops). The spacing between the hoops 1015 is selected to suit the magnitude of the high voltages provided by the generators 310 via the hoops 1015 and the makeup of the object 106 (its weight and ability to receive and store a static charge), with smaller spacing useful with heavier or more lightly charged objects 106 and with use of lower voltages at the hoops 1015.

Figure 11:
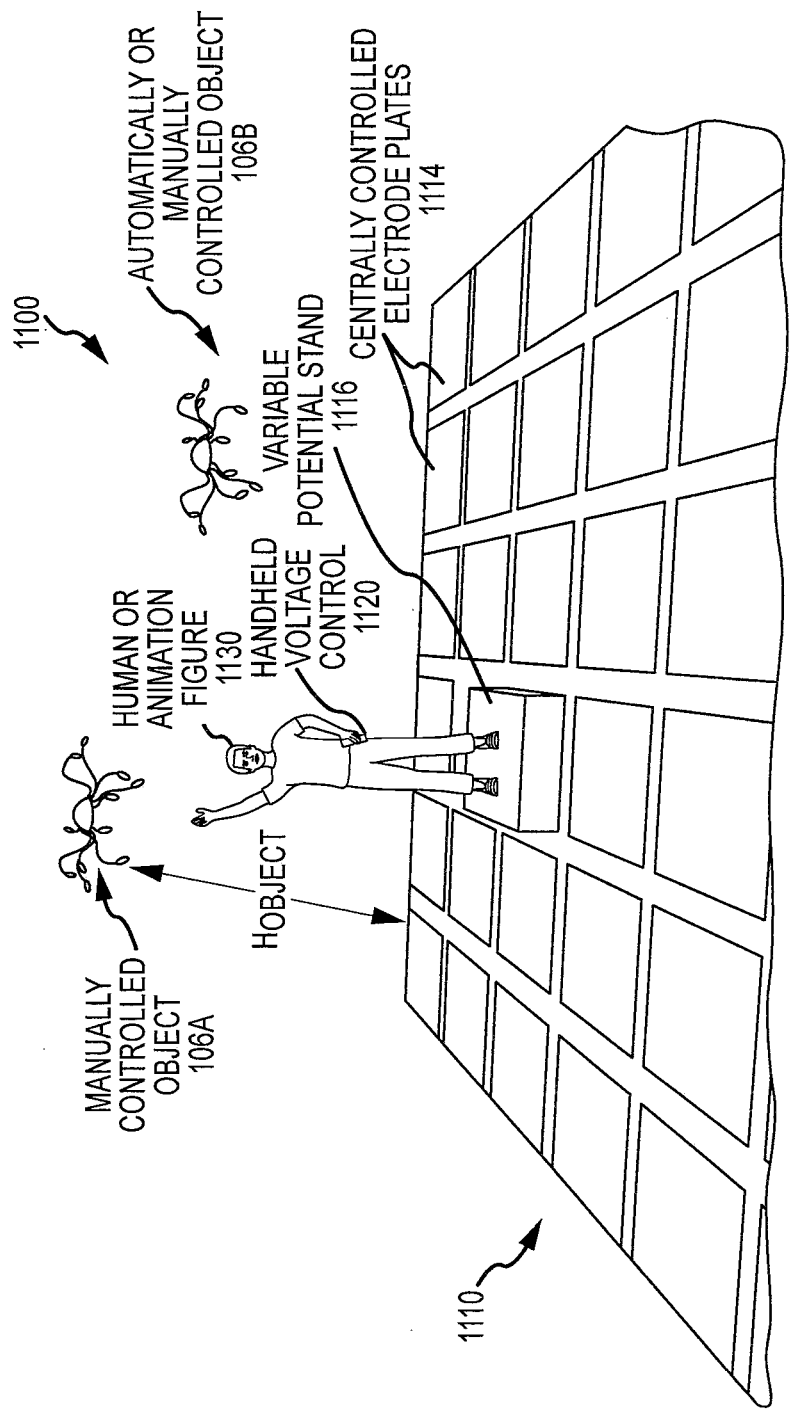
FIG. 11 illustrates an electrostatic levitation system or assembly configured to allow an operator to manually control levitation of one or more of the levitated objects while being located within the flying space (or while being positioned above the array of electrostatic generators).

In some cases, it may be desirable to allow a performer or operator to manually control the array of electrostatic generators and/or to interact with the levitating object. FIG. 11 provides an electrostatic levitation system 1100 that is adapted with this goal in mind. Particularly, an array 1110 of electrostatic generators is provided with an exposed electrode plate or charged member 1114 for each of the generators of the array 1110. This takes on the appearance of a square or rectangular array of square plates that are spaced apart from each other. The plates 1114 may be charged independently with the same or different static charges (e.g., differing high voltages) (as discussed above with a controller providing control signals separately to each high voltage electrostatic generator). These plates/electrostatically charged members 1114 can be controlled/operated by a central controller to levitate and move/position one or more objects 106B as discussed with reference to FIG. 1, for example.

Further, though, the system 1100 includes a manually controlled object 106A that is levitated at a height, $H_{Object}$, above the plane containing the plates 1114. Manual control over movement of the object 106A is achieved in system 1100 by having a human operator (or robotic/animatronic FIG. 1130 positioned above the array 1110. The operator 1130 is supported by one of the plates 1116, which may be on the same level as the plates 1114 or above these plates 1114 some distance such as on a stand or pedestal. The pedestal 1116 may be operated via a handheld voltage controller 1120 by the operator 1130 (or an offstage operator (not shown), in some cases).

The operator 1130 is charged by the variable potential stand 1116 (which is charged by a high voltage electrostatic generator (not shown in FIG. 11 but that may take the form shown in FIG. 3 or the like)). The charged operator 1130 may move their arms or other portions of their body to cause the overhead and levitating object 106A to rise and fall in height, $H_{objed}$, with the voltage maintained at a particular setting. Alternatively, the operator 1130 may use the voltage controller 1120 to operate the generator associated with the stand/plate 1116 to increase or decrease the voltage at the stand 1116 and their static charge, which even without movement of their arm or other body parts toward or away from the object 106A will cause the height, $H_{object}$, to be modified. In this way, manual control of the levitation of the object 106A is provided while concurrently the object(s) 106B are remotely or centrally controlled in a more automated manner (e.g., to follow a flight path defined by a show program (as discussed with reference to FIG. 1)).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The object levitation systems taught herein provide quiet and organic-appearing levitation of objects. Since the objects being levitated are charged with static electricity, separated portions of their bodies or appendages repel each other, and, as a result, the objects can be designed with a structure to self-assemble or "inflate" as they are lifted. In other words, a flat or limp structure with a plurality of interconnected members or strands (e.g., legs, arms, tentacles, wings, or the like) repel each other to expand the volume of the structure to form an apparently more rigid and voluminous object. Free animation can be achieved including wiggling of tendrils, flapping of wings, and so on by varying the instantaneous lifting voltage and providing appendages that are balanced at a neutral position between gravity and electrostatic suspension.

Since the objects have their position tracked (e.g., using video camera tracking) for use in controlling their trajectories, the same tracking device (e.g., same video camera) and a linked projection system may be used in some embodiments to project special effects lighting onto the flying objects. This projected lighting may be directed so as to only or mainly strike the flying objects. Dependent on the makeup of the flying objects, the now-lighted objects may appear even more magical or unreal to the audience or observers. Alternatively, the objects may be painted with black light paint and lit up with black light.

Further, the flying objects may be self lit using harvested power (use the charge received from the statically charged electrodes/pads/elements) with either electroluminescent or LED lights. In some embodiments, pure electrostatic lifting or levitation is augmented by providing lift-enhancing sections or pockets that are configured to receive (and retain) a volume of gas that is lighter than air such as helium. Such helium-filled sections or pockets may allow some of the flying objects to be larger in size while still being moved around controllably using electrostatic forces.

I claim:

1. A system for levitating an object with a body adapted for receiving a static charge, comprising:
   an array of at least three electrostatic generators, wherein each of the electrostatic generators includes an exposed element that becomes statically charged during operation of the array; and
   a controller operating to generate control signals to the array to independently operate each of the electrostatic generators to provide the static charge at first, second, and third voltages, wherein, when positioned in a flight space above the array, the object is levitated above the array of the electrostatic generators by an electrostatic lifting force.

2. The system of claim 1, wherein each of the electrostatic generators is a Van de Graaff generator and the first, second, and third voltages are in the range of 0 to 300,000 volts.

3. The system of claim 1, wherein each of electrostatic generators comprises a variable impedance device optically-controlled by the controller.

4. The system of claim 1, wherein the controller operates the array to cause the object to follow a flight path through the flight space by separately varying the first, second, and third voltages over time.

5. The system of claim 4, wherein the system further comprises a location tracking assembly determining a position of the object in the flight space and wherein the controller generates the control signals based on the determined position and the flight path.

6. The system of claim 4, wherein the exposed element of each of the electrostatic generators comprises a hoop, wherein the flight path is through the hoops, and wherein the first, second, and third voltages are alternated from positive to negative.

7. The system of claim 1, further including a portable control for one of the electrostatic generators, whereby a human operator positioned in contact with the exposed element can vary the first, second, or third voltage to manually control levitation of the object.

8. An electrostatic levitation system, comprising:
   an object with a body adapted for receiving a static charge;
   an array of electrostatic generators each including an element facing a space above the array and being adapted for receiving a static charge, wherein the static charge elements are spaced apart in the array and wherein each of the electrostatic generators are separately controllable, whereby the static charges at each of the static charge elements can be independently adjusted to levitate the object and to move the object along a predefined flight path in the space; and
   a location tracker operating to track a location of the object in the space and wherein the array is operated to modify the static charges based on a comparison of the tracked location and the flight path.

9. An electrostatic levitation system, comprising:
   an object with a body adapted for receiving a static charge; and
   an array of electrostatic generators each including an element facing a space above the array and being adapted for receiving a static charge,
   wherein the static charge elements are spaced apart in the array,
   wherein each of the electrostatic generators are separately controllable, whereby the static charges at each of the static charge elements can be independently adjusted to levitate the object and to move the object along a predefined flight path in the space, and
   wherein the electrostatic generators operate to provide the static charges at voltages in the range of 100,000 to 300,000 volts.

10. An electrostatic levitation system, comprising:
    an object with a body adapted for receiving a static charge; and
    an array of electrostatic generators each including an element facing a space above the array and being adapted for receiving a static charge,
    wherein the static charge elements are spaced apart in the array,
    wherein each of the electrostatic generators are separately controllable, whereby the static charges at each of the static charge elements can be independently adjusted to levitate the object and to move the object along a predefined flight path in the space,
    wherein the body of the object has a first side, a second side, and a rib formed of electrically insulating material between the first and second sides, wherein the static charge of the first side has a first polarity and the static charge of the second side has a second polarity opposite the first polarity, and wherein the electrostatic generators are commutated between positive and negative polarity or wherein the first and second polarities are optically commuted during operation of the system.

11. An electrostatic levitation system, comprising:
an object with a body adapted for receiving a static charge; and
an array of electrostatic generators each including an element facing a space above the array and being adapted for receiving a static charge,
wherein the static charge elements are spaced apart in the array,
wherein each of the electrostatic generators are separately controllable, whereby the static charges at each of the static charge elements can be independently adjusted to levitate the object and to move the object along a predefined flight path in the space,
wherein the static charges at the static charge elements is varied rapidly to vibrate the object and wherein the body of the object includes portions animated by the vibrating or the body is configured to emit a sound with the vibrating.

12. An electrostatic levitation system, comprising:
an object with a body adapted for receiving a static charge; and
an array of electrostatic generators each including an element facing a space above the array and being adapted for receiving a static charge,
wherein the static charge elements are spaced apart in the array,
wherein each of the electrostatic generators are separately controllable, whereby the static charges at each of the static charge elements can be independently adjusted to levitate the object and to move the object along a predefined flight path in the space, and
wherein the object includes a light source powered by DC field provided by the electrostatic generators or by an A/C generator provided in the system.

13. An electrostatic levitation system, comprising:
an object with a body adapted for receiving a static charge;
an array of electrostatic generators each including an element facing a space above the array and being adapted for receiving a static charge, wherein the static charge elements are spaced apart in the array and wherein each of the electrostatic generators are separately controllable, whereby the static charges at each of the static charge elements can be independently adjusted to levitate the object and to move the object along a predefined flight path in the space; and
a projector projecting ultraviolet (UV) light into the space above the array and wherein the body of the object includes a surface painted with UV fluorescent paint.

14. A method of electrostatically levitating objects, comprising:
charging an object with a static charge having a polarity;
positioning the object in a space over an array of electrostatic generators;
first operating the array of electrostatic generators to apply a first plurality of static charges of varying magnitude with the polarity of the static charge of the object, whereby the object is lifted to a first height in the space above the array of electrostatic generators and to a first X-Y location; and
second operating the array of electrostatic generators to apply a second plurality of static charges of varying magnitude, whereby the object is lifted to a second height in the space above the array of electrostatic generators and to a second X-Y location, wherein the second height differs from the first height and the second X-Y location differs from the first X-Y location.

15. The method of claim 14, further comprising, after the first operating, determining a location of the object in the space and comparing the determined location with a flight path for the object, wherein the second operating is performed based on a result of the comparing.

16. The method of claim 14, further comprising charging a portion of the object with another static charge with a polarity opposite the polarity of the static charge of the object and wherein the second operating of the array comprises spinning the object in the space with the second plurality of static charges include at least a number of static charges with a polarity being opposite a polarity of the first plurality of static charges.

17. The method of claim 14, further comprising third operating the array of electrostatic generators to vibrate the object in the space, wherein the object has a body adapted to emit a sound during the vibrating.

18. The method of claim 14, further comprising directing collimated light from a laser onto the object, wherein the object includes a metallic reflective or retroreflective surface, whereby the object acts as a floating microphone in the space.

19. The method of claim 14, further comprising optically commutating the polarity of the static charge of the object after the first operating of the array of electrostatic generators.

* * * * *